United States Patent
Koodli et al.

(10) Patent No.: US 9,210,728 B2
(45) Date of Patent: Dec. 8, 2015

(54) SYSTEM AND METHOD FOR RESOURCE MANAGEMENT FOR OPERATOR SERVICES AND INTERNET

(75) Inventors: Rajeev Koodli, Sunnyvale, CA (US); Andrew S. Gibbs, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/330,332

(22) Filed: Dec. 19, 2011

(65) Prior Publication Data

US 2013/0155849 A1 Jun. 20, 2013

(51) Int. Cl.
| | |
|---|---|
| G01R 31/08 | (2006.01) |
| H04W 76/02 | (2009.01) |
| H04L 12/725 | (2013.01) |
| H04L 12/927 | (2013.01) |
| H04L 12/911 | (2013.01) |
| H04L 12/54 | (2013.01) |
| H04L 12/803 | (2013.01) |
| H04W 48/18 | (2009.01) |

(52) U.S. Cl.
CPC ......... *H04W 76/022* (2013.01); *H04L 12/5692* (2013.01); *H04L 45/308* (2013.01); *H04L 47/781* (2013.01); *H04L 47/808* (2013.01); *H04L 47/125* (2013.01); *H04L 47/824* (2013.01); *H04W 48/18* (2013.01)

(58) Field of Classification Search
CPC .................................................... H04L 47/10
See application file for complete search history.

(56) References Cited

U.S. PATENT DOCUMENTS

| | | | |
|---|---|---|---|
| 7,489,936 B1 | 2/2009 | Liu | |
| 7,817,615 B1* | 10/2010 | Breau et al. | 370/349 |
| 8,560,693 B1 | 10/2013 | Wang et al. | |
| 2002/0089952 A1* | 7/2002 | Cao et al. | 370/335 |
| 2003/0145106 A1 | 7/2003 | Brown | |
| 2005/0210154 A1 | 9/2005 | Verma et al. | |
| 2006/0128384 A1* | 6/2006 | Jagadeesan et al. | 455/436 |
| 2006/0171314 A1 | 8/2006 | Qian et al. | |
| 2006/0251104 A1* | 11/2006 | Koga | 370/449 |
| 2007/0025297 A1* | 2/2007 | Lee et al. | 370/331 |
| 2007/0053370 A1 | 3/2007 | Aghvami et al. | |

(Continued)

FOREIGN PATENT DOCUMENTS

| | | |
|---|---|---|
| EP | 2187665 | 5/2010 |
| EP | 2608457 | 6/2013 |

(Continued)

OTHER PUBLICATIONS

Action Wireless Broadband Corp., "OD200 WiMAX 802.16e Outdoor CPE: The Cost-Effective Outdoor Solution for WiMAX Service Deployment," DS_OD2_V1.00, Jul. 2009, 2 pages; www.AWBnetworks.com.

(Continued)

*Primary Examiner* — Samina Choudhry
(74) *Attorney, Agent, or Firm* — Patent Capital Group

(57) ABSTRACT

A method is provided in one example embodiment and includes providing a multi-radio connectivity service to a mobile subscriber, and managing the multi-radio connectivity service for the mobile subscriber. The managing can include: providing admission control; providing privileged subscriber access at a plurality of WiFi access points; providing signaling for quality of service (QoS) equivalence across a WiFi network and a mobile network; and distributing certain traffic based on a policy.

20 Claims, 8 Drawing Sheets

(56) References Cited

U.S. PATENT DOCUMENTS

| | | | |
|---|---|---|---|
| 2007/0264969 A1 | 11/2007 | Frank et al. | |
| 2008/0031188 A1* | 2/2008 | Magnusson et al. | 370/329 |
| 2008/0032713 A1 | 2/2008 | Yang | |
| 2008/0056210 A1 | 3/2008 | Yaqub | |
| 2008/0181147 A1* | 7/2008 | Rydnell et al. | 370/310 |
| 2008/0280612 A1 | 11/2008 | Bornier et al. | |
| 2009/0016292 A1 | 1/2009 | Visnawath et al. | |
| 2009/0016344 A1 | 1/2009 | Hu et al. | |
| 2009/0103491 A1* | 4/2009 | Zuniga et al. | 370/331 |
| 2009/0168692 A1 | 7/2009 | Chen | |
| 2009/0232091 A1* | 9/2009 | Khan | 370/331 |
| 2009/0245202 A1* | 10/2009 | Gras et al. | 370/331 |
| 2009/0259736 A1* | 10/2009 | Chang et al. | 709/221 |
| 2009/0293106 A1* | 11/2009 | Gray et al. | 726/4 |
| 2010/0046369 A1* | 2/2010 | Zhao et al. | 370/232 |
| 2010/0056152 A1* | 3/2010 | Penhoat et al. | 455/436 |
| 2010/0075698 A1 | 3/2010 | Rune et al. | |
| 2010/0085884 A1* | 4/2010 | Srinivasan et al. | 370/252 |
| 2010/0220680 A1 | 9/2010 | Ramankutty et al. | |
| 2011/0075557 A1 | 3/2011 | Chowdhury et al. | |
| 2011/0103310 A1 | 5/2011 | Stojanovski et al. | |
| 2011/0106709 A1 | 5/2011 | Puura et al. | |
| 2011/0202641 A1 | 8/2011 | Kahn et al. | |
| 2011/0222399 A1 | 9/2011 | Shi et al. | |
| 2011/0263258 A1 | 10/2011 | Soliman et al. | |
| 2012/0008525 A1 | 1/2012 | Koskinen | |
| 2012/0079559 A1* | 3/2012 | Reznik et al. | 726/1 |
| 2012/0127974 A1 | 5/2012 | Doppler et al. | |
| 2012/0142352 A1* | 6/2012 | Zhang et al. | 455/436 |
| 2012/0207174 A1 | 8/2012 | Shieh | |
| 2012/0213072 A1* | 8/2012 | Kotecha et al. | 370/235 |
| 2012/0302244 A1 | 11/2012 | Sridhar et al. | |
| 2013/0095806 A1* | 4/2013 | Salkintzis et al. | 455/414.3 |
| 2013/0122921 A1 | 5/2013 | Juppi et al. | |
| 2013/0326058 A1 | 12/2013 | Brady et al. | |
| 2014/0105129 A1 | 4/2014 | Chen | |
| 2014/0146802 A1 | 5/2014 | Kutt et al. | |
| 2014/0148129 A1 | 5/2014 | Lundstrom | |
| 2014/0369198 A1 | 12/2014 | Rinne et al. | |

FOREIGN PATENT DOCUMENTS

| | | |
|---|---|---|
| EP | 2608458 | 6/2013 |
| EP | 2608617 | 6/2013 |
| EP | 2665318 | 11/2013 |

OTHER PUBLICATIONS

"WiMAX Deployment," WiMAX Base Station Demo at GEC 6, Nov. 17, 2009, 28 pages; http://groups.geni.net/geni/wiki/WiMAXInteg.

U.S. Appl. No. 13/330,464, filed Dec. 19, 2011, entitled "System and Method for Resource Management for Operator Services and Internet," Inventor(s): Rajeev Koodli.

U.S. Appl. No. 13/369,373, filed Feb. 9, 2012, entitled "System and Method for Resource Management for Operator Services and Internet," Inventor(s): Rajeev Koodli, et al.

U.S. Appl. No. 13/472,306, filed May 15, 2012, entitled "System and Method for Scoped Paging in Multi-Radio Heterogeneous Networks," Inventor: Rajeev Koodli.

USPTO Jul. 20, 2012 Non-Final Office Action from U.S. Appl. No. 13/472,306.

USPTO Oct. 18, 2012 Response to Jul. 20, 2012 Non-Final Office Action from U.S. Appl. No. 13/472,306.

U.S. Appl. No. 13/690,847, filed Nov. 30, 2012, entitled "System and Method Associated With a Service Flow Router" Inventor: Arun Kavunder.

U.S. Appl. No. 13/690,990, filed Nov. 30, 2012, entitled "Systm and Method Associated With a Service Flow Router" Inventor: Arun Kavunder.

USPTO Jan. 31, 2013 Final Office Action from U.S. Appl. No. 13/472,306.

USPTO Apr. 22, 2013 RCE Response to Final Office Action dated Jan. 31, 2013 from U.S. Appl. No. 13/472,306.

USPTO May 15, 2013 Notice of Allowance from U.S. Appl. No. 13/472,306.

EPO Apr. 23, 2013 European Search Report and Opinion from European Patent Application No. 12159101.0; 5 pages.

3GPP TS 24.312 V11.0.0 (Sep. 2011) Technical Specification, "3$^{rd}$ Generation Partnership Project: Technical Specification Group Core Network and Terminals; Access Network Discovery and Selection Function (ANDSF) Management Object (MO) (Release 11)," 3GPP Standard, 3$^{rd}$ Generational Partnership Project (3GPP), Mobile Competence Centre; 650 Route Des Lucioles; F-06921 Sophia-Antipolis Cedex, France; vol. CT WG1 No. V11.0.0, Sep. 2011, 157 pages.

3GPP TS 23.402 V11.1.1 (Dec. 2011) Technical Specification, "3$^{rd}$ Generation Partnership Project; Technical Specification Group Services and System Aspects; Architecture Enhancements for non-3GPP accesses (Release 11)," 3GPP Draft; 23401-B10_CRS_Implemented, 3$^{rd}$ Generational Partnership Project (3GPP), Mobile Competence Centre; 650 Route Des Lucioles; F-06921 Sophia-Antipolis Cedex; France; Dec. 2011; 232 pages.

EPO Sep. 30, 2013 European Search Report and Written Opinion from European Patent Application No. 12195950.6; 13 pages.

USPTO Jun. 25, 2014 Non-Final Office Action from U.S. Appl. No. 13/369,373.

USPTO Jun. 6, 2014 Non-Final Office Action from U.S. Appl. No. 13/330,464.

USPTO Jul. 16, 2014 Non-Final Office Action from U.S. Appl. No. 13/690,847.

USPTO Nov. 4, 2014 Non-Final Office Action from U.S. Appl. No. 13/690,990.

USPTO Feb. 20, 2015 Final Office Action from U.S. Appl. No. 13/369,373.

USPTO Mar. 18, 2015 Non-Final Office Action from U.S. Appl. No. 13/330,464.

USPTO Dec. 15, 2014 Final Office Action from U.S. Appl. No. 13/690,847.

EPO Aug. 7, 2015 European Search Report and Written Opinion from European Patent Application No. 12169630; 6 pages.

EPO Aug. 13, 2015 European Search Report and Written Opinion from European Patent Application No. 12159097; 6 pages.

* cited by examiner

SYSTEM AND METHOD FOR RESOURCE MANAGEMENT FOR OPERATOR SERVICES AND INTERNET

TECHNICAL FIELD

This disclosure relates in general to the field of communications and, more particularly, to providing resource management for operator services and Internet.

BACKGROUND

Wireless communication technologies are used in connection with many applications involving laptop computers, cellular telephones, user equipment, tablets, etc. Wireless communication technologies are tasked with handling increased amounts of data traffic, where the types of data being transported through mobile wireless networks have changed dramatically. This is because of device sophistication, which fosters data-intensive activities such as displaying movies, playing video games, readily attaching photographs to e-mails and text messages, etc. Moreover, video file-sharing and other types of usages (more traditionally associated with wired networks) have been gradually displacing voice as the dominant traffic in mobile wireless networks. There is a significant challenge for system architects and mobile operator providers to maintain a stable/reliable network environment and to provide optimal performance for their subscribers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
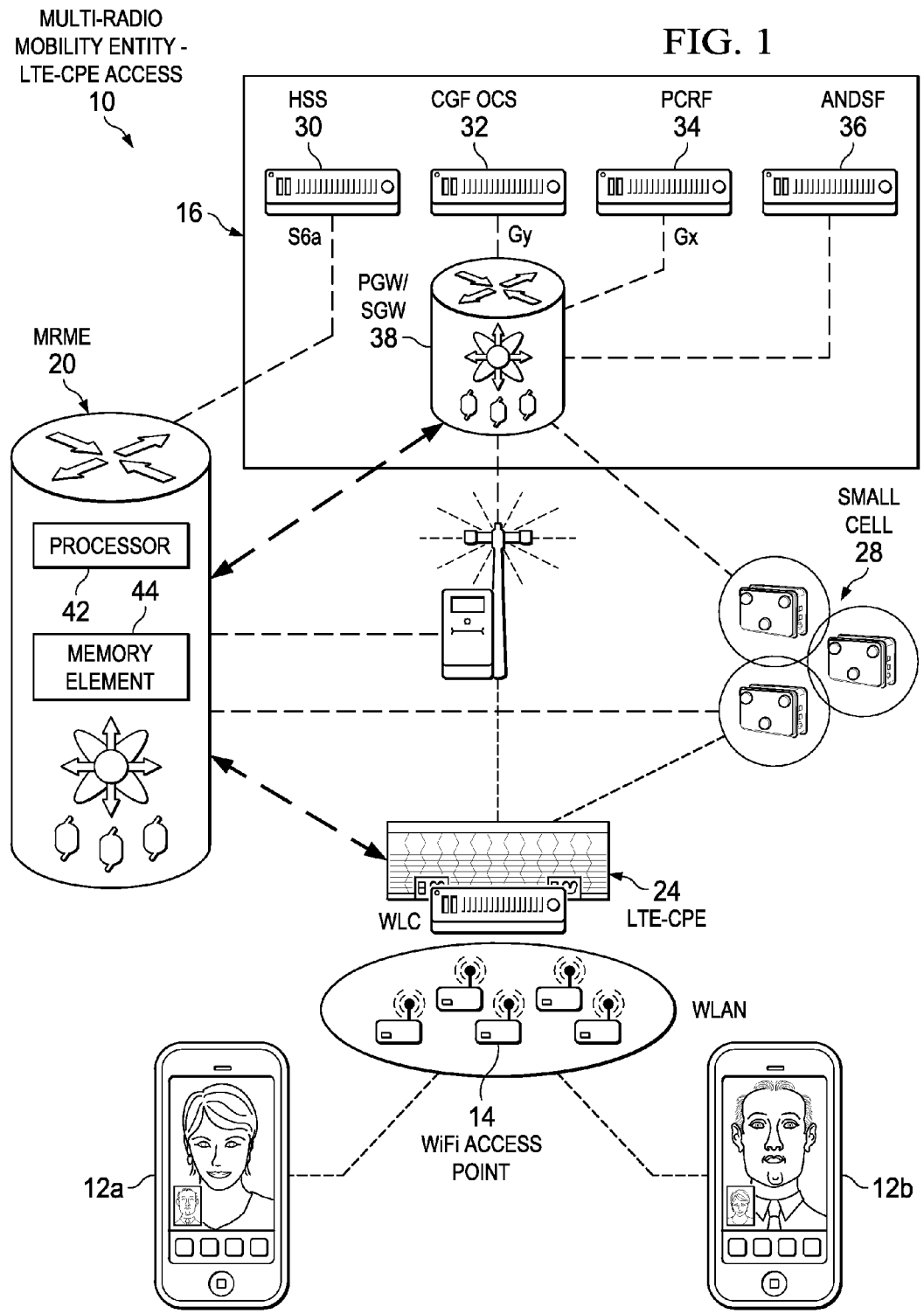
FIG. 1 is a simplified block diagram of a communication system for providing multi-radio management in accordance with one embodiment of the present disclosure.

A method is provided in one example embodiment and includes providing a multi-radio connectivity service to a mobile subscriber, and managing the multi-radio connectivity service. The managing can include providing admission control; providing privileged subscriber access at a plurality of WiFi access points; providing signaling to ensure quality of service (QoS) equivalence across a WiFi network and a mobile network (i.e., a cellular network); and distributing certain traffic based on a policy, which can be provisioned by a service provider, a network operator, a mobile service provider, a mobile subscriber himself, etc. The method can include any other suitable management activities associated with managing radio resources (bandwidth, tunnels, links, connections, session continuity, handover/handoff, etc.) for a given mobile subscriber. The connectivity service may be based on a geo-context, which is associated with preferred services for a location, as specified by any given policy. Connecting services can include any suitable service provider service, Internet service, mobile service provider service, or any other suitable service to be provided to a mobile subscriber.

In yet another embodiment, the method may include establishing a first connection to a long-term evolution-customer premise equipment (LTE-CPE), which is coupled to a WiFi access point associated with user equipment (UE) and a WiFi network. The method also includes establishing a second connection to provide an LTE service over a backhaul. The method also includes managing radio resources for the UE at a network element, where the radio resources are associated with a WiFi network and the LTE service.

In certain implementations, a local area network (LAN) session involving the UE is multiplexed to a mobile network session to provide session continuity for the UE. Additionally, traffic is loadbalanced across a LAN and a cellular access using dynamic host configuration protocol (DHCP) options. The method can include establishing a connection with a packet gateway (PGW)/serving gateway (SGW), which is coupled to a small cell that is coupled to the LTE-CPE.

In more particular embodiment, the method can include performing connection admission control of WiFi subscribers based on a plurality of mobile network parameters. The plurality of mobile network parameters are provided in a wireless connectivity object (WCO), and the WCO includes an aggregate maximum bit rate (AMBR) parameter, an allocation and retention priority (ARP) parameter, and a quality of service (QoS) class identifier.

In certain example scenarios, the method can include pre-empting an existing connection for a certain UE at a WiFi access point in favor of a different UE possessing certain subscription credentials. The existing connection can be redirected to a different WiFi access point. Additionally, a privileged access control is provided at a WiFi access point, and a subscriber identity is verified before being allowed access at the WiFi access point. Mobile network QoS parameters for the UE can be signaled to the WiFi access network such that the WiFi access network is able to obtain WiFi QoS parameters that are equivalent to the mobile network QoS parameters.

The method can also include enforcing rate-limiting of subscriber traffic in the WiFi access network based on an equivalent to an aggregate maximum bit rate (AMBR) parameter. Service data flow rules can be used to mark Differentiated Services Code Point (DSCP) in certain Internet protocol (IP) headers to enable the WiFi access point to provide WiFi QoS consistent with mobile network subscription parameters. Additionally, signaling can be performed to establish tunnels from a WiFi access network gateway to a mobile network gateway. Connectivity parameters can be received as new DHCP or IPv6 Neighbor Discovery options. The WiFi access point is signaled to establish a tunnel with the WiFi access network gateway.

Example Embodiments

Turning to FIG. 1, FIG. 1 is a simplified block diagram of a communication system 10 for providing multi-radio management for Internet and operator services in accordance with one embodiment of the present disclosure. In a particular implementation, the architecture of FIG. 1 may work in conjunction with local area network (LAN) access and a long-term evolution (LTE) service, which includes a backhaul. Communication system 10 may include multiple instances of user equipment (UEs) 12a-x and one or more WiFi wireless access points (WAPs) 14, which collectively form a wireless LAN (WLAN). In addition, FIG. 1 illustrates a small cell 28 and a multi-radio management entity (MRME) 20, which includes a processor 42 and a memory element 44. Also provided in communication system 10 is an LTE-CPE 24, which may include wireless LAN controller (WLC), and which may provide an interface between the WLAN and MRME 20 and small cell 28.

In certain embodiments, the architecture of FIG. 1 may include infrastructure (generally indicated at arrow 16), which may include a packet data gateway/serving gateway (PGW/SGW) 38. PGW/SGW 38 is coupled to a home subscriber server (HSS) 30, a charging gateway function online charging system 32, a policy and charging rules function (PCRF) 34, and an access network delivery selection function (ANDSF) 36. Communications between these elements may occur over the S6a interface, the Gy interface, the Gx interface, or over any other suitable link or interface.

In operation, MRME 20 can be configured to perform subscriber admission control based on evolved packet core (EPC) subscriptions. Additionally, MRME 20 is configured to provide nomadic (or mobile) session decisions, EPC-equivalent quality of service (QoS) signaling. In addition, MRME 20 is configured to offer privileged access control, along with traffic routing rule delivery.

For purposes of illustrating certain example techniques of communication system 10, it is important to understand the typical communications that may be traversing the WiFi/cellular networks. The following foundational information may be viewed as a basis from which the present disclosure may be properly explained. Several deployments require access to the Internet and operator services via the LAN access (such as WiFi). For example, these can include residential broadband without wireline backhaul, hotspots, hotzones, high-density venues such as stadiums, etc. LTE can provide backhaul technology for such deployments and offer a capacity savings for the operator, since a single EPS bearer is statistically multiplexed across multiple LAN users. LTE can also offer coverage relief for the operator because a LAN technology is used for access. Also, the LTE framework offers a predictable service delivery based on known technology (without relying on 3rd parties).

In such an architecture, the end users may use either the LAN or the cellular network to access the Internet and the operator services. However, in such LAN-multiplexed-on-LTE deployments, several problems should be resolved. For example, the operators should be able to authenticate LAN users before allowing access via LTE. This is a basic requirement that can be accomplished using protocol procedures specified in various standards (e.g., 3GPP). Operators should also account for admission control for LAN users to ensure predictable service. In essence, in order to ensure predictability across the LAN and cellular networks, there needs to be a way to limit a total number of users attached to the LAN. Separately, operators should limit the users accessing the LTE service based on the physical location. Additionally, operators should provide session continuity with common policies across LAN and cellular access. Essentially, subject to policy, a user's session via the LAN and cellular access should be able to continue regardless of access movements.

Operators should also balance traffic across LAN and cellular networks. For example, when a user has both LAN and cellular access, the operator should be able to distribute the traffic load based on the suitability of services and access. Also, operators should offer common policy management, where the operator applies policies consistently across access networks. Note that with the LTE backhaul, there is a need for hierarchical policy management because a LAN user's policy is subject to the policy affecting the LTE backhaul subscription. Furthermore, a LAN user may have independent policy profiles for the cellular network.

In accordance with the teachings of the present disclosure, the architecture of communication system 10 is configured to address these issues (and others) in offering an effective platform for managing resources across networks. More specifically, the solution includes leveraging MRME 20 and LTE-CPE 24, which can include LTE user equipment, along with a wireless LAN router, the WLC, and an Internet offload interface (where the WLC and the Internet offload interface may be viewed as optional). MRME 20 can intelligently manage the LAN user's session on LTE-CPE 24, as well as directly managing this device. In addition, PGW/SGW 38 is configured to manage the LAN user's EPC session in accordance with the policy governing both the LTE-CPE and the user.

In more specific terms, the architecture of FIG. 1 can provide the following functionalities. For admission control for LAN users, the number of users accessing the Internet and operator services can be limited by MRME 20, thereby providing some degree of service assurance to subscribers. In regards to QoS in the LAN, the LAN can be programmed with QoS parameters consistent with the user's policy and subscription in the EPC. This can ensure consistent and predictable subscriber experiences. For close subscriber group support, a subset of LAN users with access privileges would be allowed to access certain LTE-CPEs (e.g., based on physical location of the LAN and LTE-CPE). For session continuity, a LAN user's session multiplexed on the LTE-CPE can be adjoined with the LAN user's mobile network session, thus providing session continuity and common policy application. In addition, for flow mobility, based on policy, the PGW can loadbalance traffic across LAN and cellular access. This information can be provided to the LAN device through one or more new dynamic host configuration protocol (DHCP) options. In alternative embodiments, a 3rd party device (e.g., a 3GPP ANDSF function) can be triggered by the PGW to signal the LAN device.

For hierarchical policy management, embodiments of the present disclosure can offer a mechanism for managing a user's policy as a member of a larger group depending on the type of access. For example, a user accessing the EPC via the LAN would be subject to a policy governing the subscription itself, as well as the policy governing the user within the realm of LTE-CPE access. An independent policy may apply for such a user accessing the EPC directly through cellular access. The actual connectivity can be associated with any appropriate radio technology (e.g., 3G UMTS/CDMA, 4G LTE, WLAN, etc.).

In regards to the LTE radio access options, for an LTE UE with WiFi, the UE has an LTE radio to a macrocell as the backhaul. The UE reflects a UE from the mobility management entity (MME) and PGW perspective. The UE can be a WiFi router IPv6 prefix delegations and IPv4 network address translation (NAT). Example scenarios can include residential applications, low-to-medium density hot-zones, enterprise branch offices, etc. In the case of an LTE UE associated with WiFi and a small cell, the UE has an LTE radio that connects to a small cell for higher capacity, which could be dedicated for the UE. In addition, backhaul from the small cell may be wireless or wired and, further, may need to be secured. The UE reflects a UE from the MME and PGW perspective. The UE can be a WiFi router with IPv6 prefix delegations and IPv4 NAT. Scenarios can include high-density venues (e.g., concerts, stadiums, Times Square, etc.).

MRME 20 is also configured execute operations in order to engender a unified subscriber control. In a generic sense, MRME 20 is reflective of a centralized function: overseeing the management of different radio access technologies. For example, MRME 20 performs connection admission control of WiFi subscribers based on a combination of mobile network (3G, 4G) parameters (e.g., including the aggregate maximum bit rate (AMBR), allocation and retention priority (ARP), QoS class identifier (QCI), etc.). This can pertain to already admitted users at a WiFi access point, as well as the subscription information of a new attachment request. (Note that the terms 'mobile network' and 'cellular network' are interchangeable, as used herein.)

In certain cases, MRME 20 is configured to preempt an existing connection of a subscriber at a WiFi access point in favor of a new subscriber, who possesses better (preferred) subscription credentials. Furthermore, MRME 20 can preempt an existing connection of a subscriber at a WiFi access point in favor of a new subscriber possessing better subscription credentials. MRME 20 can subsequently provide a redirect service to the preempted subscriber so that the preempted subscriber could attach to a new WiFi access point.

Additionally, MRME 20 can perform privileged access control at a WiFi access point (e.g., a VIP lounge at an entertainment venue) in which MRME 20 verifies if the provided subscriber identity is allowed access at that particular WiFi access point. This can be achieved by consulting a local or external database consisting of geographical location of the WiFi access point, WiFi access point identifier, the service set identifier (SSID), a list of allowed users, etc. MRME 20 can be configured to provide a redirect service to a subscriber who is denied privileged access at a WiFi access point so that the subscriber can attempt connection to a different WiFi access point. In certain instances, MRME 20 can be configured to provide a redirect service to a privileged subscriber to attach to another WiFi access point with privileged access. This action may be performed, for instance, due to capacity limitation at the first WiFi access point.

In certain scenarios, MRME 20, after performing connection admission control and or privileged access control, performs the signaling of QoS parameters to the WiFi access network (represented by a gateway node) such that the WiFi access network is able to obtain those QoS parameters that are equivalent to the mobile network (3G, 4G) QoS parameters. This signaling is typically done at the time of connection establishment with the mobile network, but it may also be done at any other appropriate time. Specifically, MRME 20 is configured to signal the wireless connectivity object (WCO), which contains the equivalent parameters (including AMBR, ARP, QoS class identifier (QCI), and service data flow rules). A service data flow (SDF) represents traffic of particular kind such as the worldwide web, YouTube, Facebook, etc. The service data flow rules can identify the treatment of different subscriber traffic, as well as the charging characteristics for the identified service data flows. The charging characteristics provide the information for the WiFi access network gateway to generate billing records.

The WiFi access network gateway (WAG) can enforce rate-limiting of subscriber traffic in the WiFi access network based on the equivalent AMBR parameter. Additionally, the WiFi access network gateway marks or re-marks the Differentiated Services Code Point (DSCP) in the IP header in accordance with the service data flow rules. Such marking or re-marking (when an already marked DSCP is not compliant with the SDF Rules) enables the WiFi access points to provide WiFi radio QoS that is consistent with the mobile network subscription parameters. The WiFi access network gateway can generate the subscriber billing records for the traffic served based on the charging characteristics that are provided. Note that the WAG is further detailed below in conjunction with the discussion of FIG. 5.

MRME 20, after performing the connection admission control and or privileged access control, can perform the signaling with the WiFi access network (represented by a gateway node) so that the WiFi access network gateway can establish the connectivity with the mobile network (represented by the mobile network gateway such as a PGW (in 4G LTE), GGSN (in 3G UMTS), HA (in 3G CDMA), etc.). Specifically, the signaling is performed to establish the tunnels from the WiFi access network gateway to the mobile network gateway, as well as from the WiFi access network gateway to the WiFi access point.

Additionally, MRME 20 can be configured to provide the mobile UE specific parameters (e.g., the WiFi access point, and the mobile network gateway IP address to the WiFi access network gateway) as new DHCP options or IPv6 Neighbor Discovery options in the router solicitation message. The UE specific parameters can include the IMSI, UE-QoS (as identified in the subscription), and UE link-layer identifier. The WiFi access point parameters include a tunnel endpoint IP address, a GRE (or other tunnel identifier) key, AP geographic location, etc.

As an alternative to DHCP or IPv6 Neighbor Discovery, MRME 20 may provide the required tunneling parameters in an authentication, authorization, and accounting (AAA) message. The net result is that the WiFi access network gateway is able to establish the tunnel with the mobile network gateway. Additionally, the WiFi access network gateway provides connectivity parameters back to the MRME as new DHCP or IPv6 Neighbor Discovery options. These parameters include the UE-specific parameters (such as the assigned IP address and other relevant parameters), as well as its own tunnel parameters (such as the tunnel endpoint IP address, GRE key, etc.). As an alternative to DHCP or IPv6 Neighbor Discovery, the WiFi access network gateway may provide the required tunneling parameters in an AAA message.

MRME 20 can subsequently signal the WiFi access point to establish a tunnel with the WiFi access network gateway. This signaling may include the tunnel endpoint parameters of the WiFi access network gateway, as well as the WiFi subscriber identification (such as the assigned IP address/prefix and/or the MAC layer address) as new parameters that can be realized in the 'Control And Provisioning of Wireless access points' (CAPWAP) protocol in a particular embodiment of the present disclosure. Such a tunnel could be on a per-subscriber basis, or provided as an aggregate tunnel for a group of subscribers attached to the WiFi access point.

In terms of the infrastructure of the present disclosure, UEs 12a-x can be associated with clients, customers, endpoints, handheld devices, or end users wishing to initiate a communication in communication system 10 via some network. The term 'UE' and the term 'mobile subscriber' are inclusive of devices used to initiate a communication, such as a receiver, a computer, a router, a gateway, a network appliance, a proprietary device, a set-top box, an Internet radio device (IRD), a cell phone, a smartphone of any kind, a tablet, a personal digital assistant (PDA), an iPhone, an iPad, a Google Droid, or any other device, component, element, or object capable of initiating voice, audio, video, media, or data exchanges within communication system 10. UEs 12a-x may also be inclusive of a suitable interface to the human user, such as a display, a keyboard, a touchpad, a remote control, or other terminal equipment. UEs 12a-x may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

WAPs 14 are configured to connect one or more UEs 12a-x to a network (e.g., a WiFi network). WAPs 14 may resemble a network hub, relaying data between connected wireless devices (e.g., UEs 12a-x) in addition to a connected wired device (e.g., an Ethernet hub or switch). This allows wireless devices to communicate with other wired and wireless devices. Networks of the present disclosure represent a series of points or nodes of interconnected communication paths for receiving and transmitting packets of information that propagate through the architecture. Each network can offer a communicative interface between sources and/or hosts, and each may be any LAN, WLAN metropolitan area network (MAN), Intranet, Extranet, wide area network (WAN), virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

PCRF 34 may be configured to determine policy rules in real-time in a multimedia network. PCRF 34 can operate at a network core and access subscriber databases and other specialized functions, such as charging systems, in a scalable and centralized manner. PCRF 34 is the part of the network architecture that aggregates information to and from the network, operational support systems, and other sources (such as portals) in real time, supporting the creation of rules and then making policy decisions for each UE 12a-x active on the network. AAA nodes in the network may provide authentication, authorization, and accounting for UEs 12a-x accessing and using communication system 10. HSS 30 may provide management of a centralized subscriber database of UEs 12a-x accessing and using communication system 10.

Figure 2:
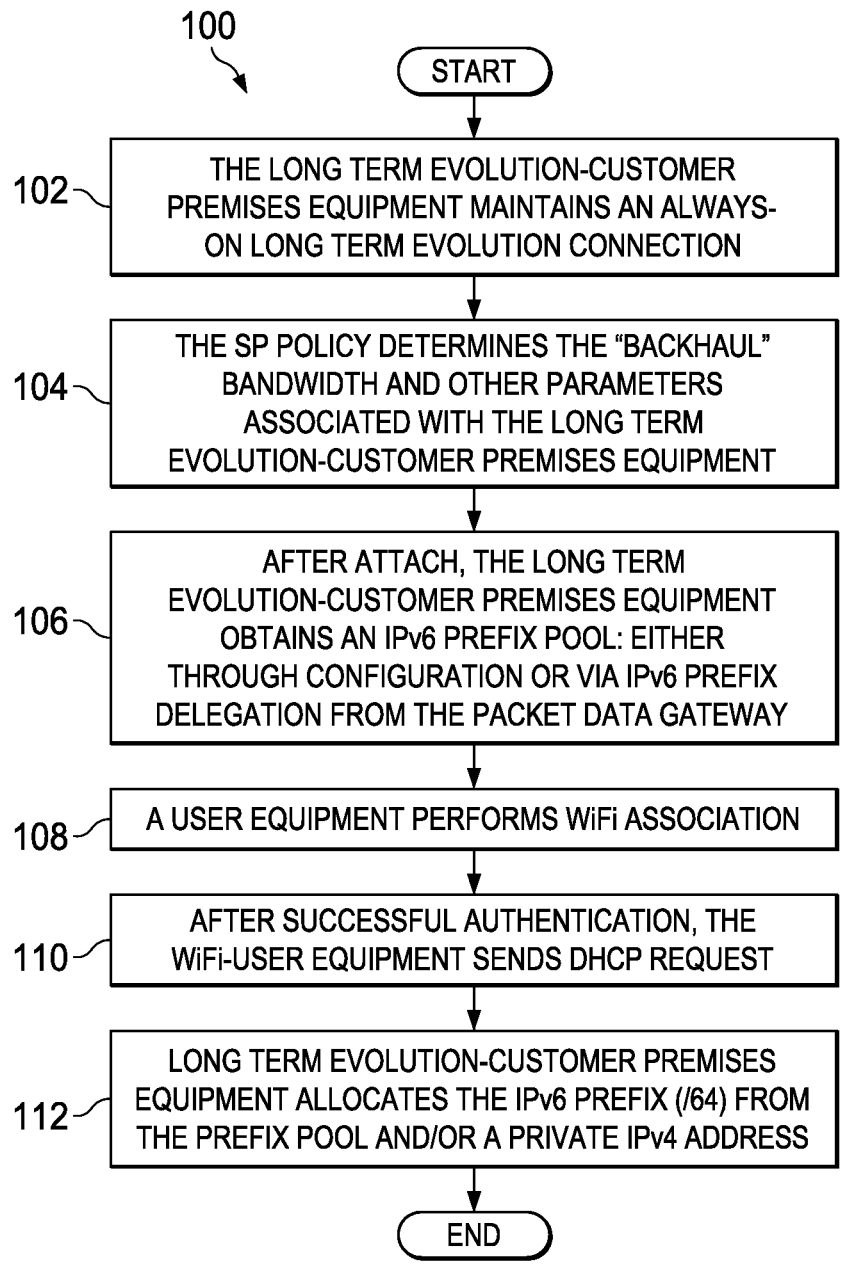
FIG. 2 is a simplified flowchart illustrating possible example details associated with the communication system.

Turning to FIG. 2, FIG. 2 is a simplified flowchart 100 illustrating an operating procedure for an LTE-CPE with WiFi. In a general sense, the signaling messages provided are meant to be an embodiment of general-purpose procedures. This particular flow may begin at 102, where the LTE-CPE maintains an always-on LTE connection. At 104, the service provider (SP) policy can determine the backhaul bandwidth and other parameters associated with the LTE-CPE. At 106, after suitable attachment, the LTE-CPE obtains an IPv6 prefix pool (e.g., either through configuration or via IPv6 prefix delegation from the PGW). At 108, user equipment (UE) can perform the WiFi association. More specifically, the UE has a subscription with the service provider and, therefore, can present credentials for EPC authentication. In certain scenarios, the 802.1x authentication is followed by the Extensible Authentication Protocol (EAP)-Authentication and Key Agreement (AKA)/AKA being performed. The WLC in the LTE-CPE can operate as the authenticator, where it routes the messages to the operator's AAA server/authentication center (AuC). At 110, after successful authentication, the WiFi-UE sends a DHCP request. At 112, the LTE-CPE allocates the IPv6 prefix from the prefix pool and/or a private IPv4 address.

Figure 3A:
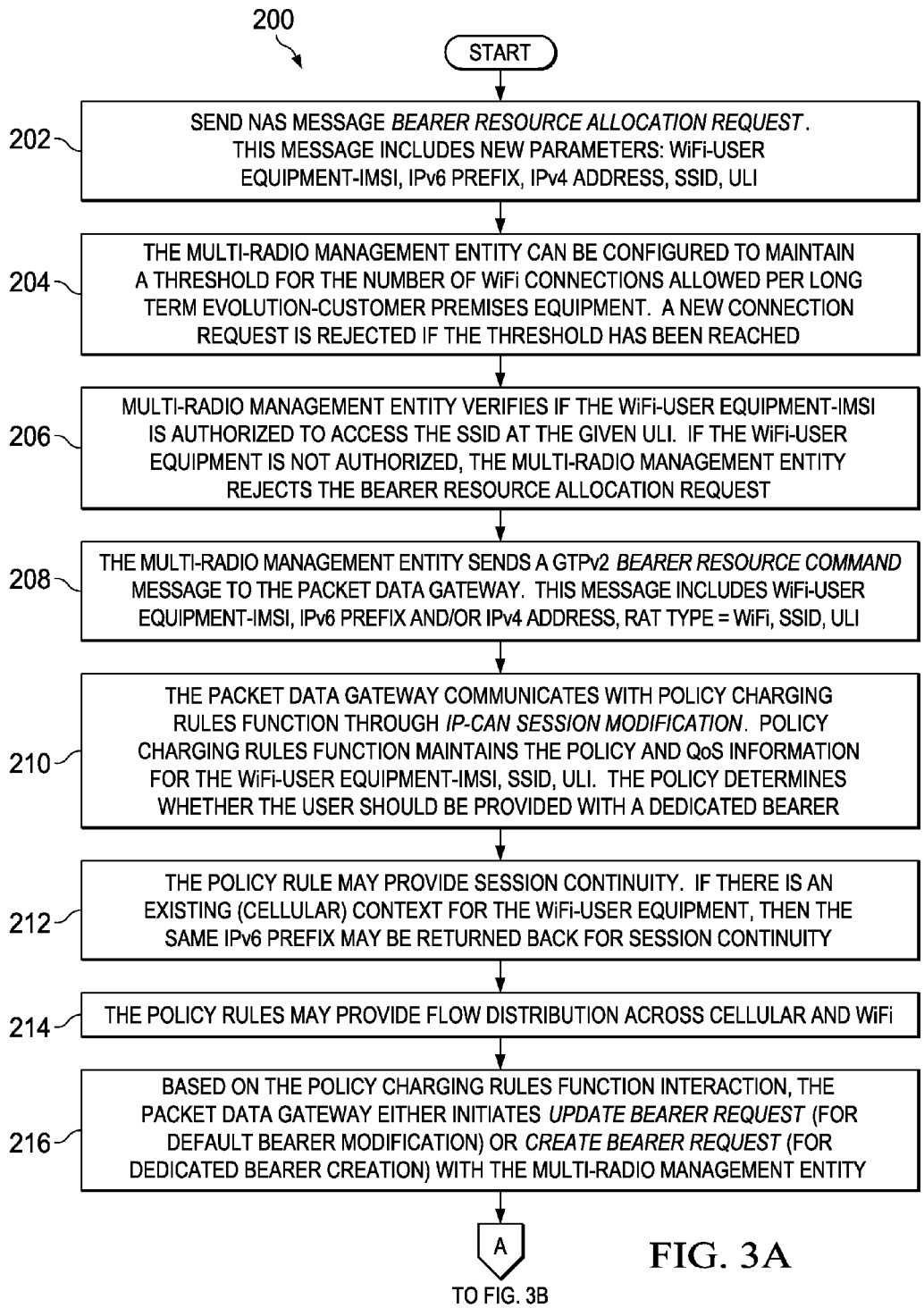
FIGS. 3A-3B are simplified flowcharts illustrating potential operations associated with the communication system.
Figure 3B:
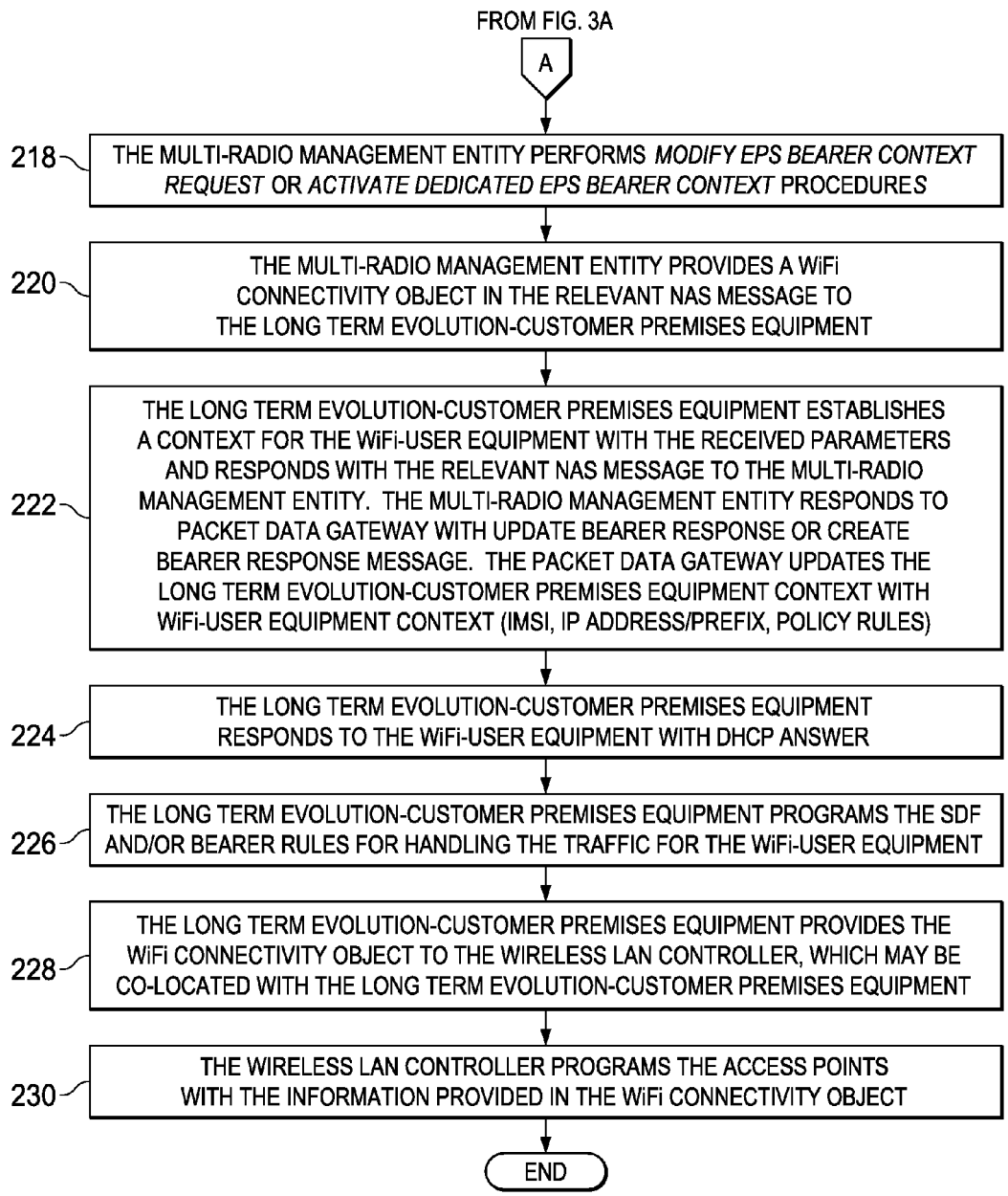

Turning to FIGS. 3A-3B, FIGS. 3A-3B are simplified flowcharts 200 illustrating the LTE-CPE performing a WiFi-UE connection procedure. This particular flow may begin at 202, where a Non-Access Stratum (NAS) message (bearer resource allocation request) is sent. This message may include new parameters: WiFi-UE-IMSI, IPv6 prefix, IPv4 address, SSID, user location information (ULI), etc. At 204, for admission control, MRME 20 can be configured to maintain a threshold for the number of WiFi connections allowed per LTE-CPE. A new connection request is rejected if the threshold has been reached. More sophisticated admission control methods can be equally used. At 206, for the close subscriber group support, this can be thought of as a value-add feature for WiFi. MRME 20 is configured to verify if the WiFi-UE-IMSI is authorized to access the SSID at the given ULI. If the WiFi-UE is not authorized, MRME 20 rejects the bearer resource allocation request.

At 208, MRME 20 sends a GPRS Tunneling Protocol (GTP)v2 bearer resource command message to the PGW. This message can include WiFi-UE-IMSI, IPv6 prefix and/or IPv4 address, radio access technology (RAT) Type=WiFi, SSID, ULI. It should be noted that the presence of WiFi-UE-IMSI is an indication to the PGW that a WiFi user is being "multiplexed" to the LTE-CPE. There can be other explicit indications provided at this juncture. At 210, the PGW communicates with the PCRF (e.g., through IP-CAN session modification). The PCRF can maintain the policy and QoS information for the WiFi-UE-IMSI, SSID, and ULI. The policy can determine whether the user should be provided with a dedicated bearer.

In terms of session continuity, at 212 the policy rule may provide appropriate session continuity. If there is an existing (cellular) context for the WiFi-UE, then the same IPv6 prefix may be returned back for session continuity. Different policy rules can still apply based on RAT type. At 214, for flow mobility, the policy rules may provide flow distribution across cellular and WiFi. In this case, the PGW may trigger the ANDSF server with the required flow rules to communicate with the UE. Alternatively, the flow rules may be provided in the GTP and NAS messages, where the LTE-CPE may provide the flow specs using DHCP options. At 216, based on the PCRF interaction, the PGW either initiates an update bearer request (for default bearer modification) or create bearer request (for dedicated bearer creation) with MRME 20. In either message, the PGW can include an IE containing the signature definition file (SDF) rules for the WiFi-UE. The rules may be specific to location (and/or time of day (ToD)).

At 218, MRME 20 can generate a modify EPS bearer context request or activate dedicated EPS bearer context procedures. At 220, MRME 20 is configured to provide a WiFi connectivity object (WCO) in the relevant NAS message to the LTE-CPE. The WCO contains the SDF rules provided by the PGW, and a mapping of the EPC QoS parameters to the WiFi QoS parameters. At 222, the LTE-CPE establishes a context for the WiFi-UE with the received parameters and responds with the relevant NAS message to MRME 20. MRME 20 responds to PGW with update bearer response or create bearer response message. The PGW updates the LTE-CPE context with WiFi-UE context (IMSI, IP address/prefix, policy rules). This completes the SDF/Bearer establishment on the LTE side for the WiFi-UE. As 230, the LTE-CPE responds to the WiFi-UE with DHCP answer.

The IPv6 prefix and/or IPv4 address provided to the WiFi-UE depends on what is supplied in the NAS message. Specifically, if session continuity is provided, the addresses will be those supplied by the PGW (and not the ones allocated by the LTE-CPE in a previous step). This would complete the "WiFi-UE Connect" procedure. At 226, the LTE-CPE programs the SDF and/or bearer rules for handling the traffic for the WiFi-UE. At 228, the LTE-CPE provides the WCO object to the WLC, which may be co-located with the LTE-CPE. At 230, the WLC programs the access points with the information provided in the WCO (e.g., IPv6 prefix, IPv4 address, MAC address of the WiFi-UE, 802.11n user priority levels etc.).

Turning to the specific functions associated with the architecture of FIG. 1, for the PGW (offering a hierarchical UE context), this element should multiplex a UE (LTE-CPE) context among multiple WiFi UEs using the LTE-CPE. The WiFi UEs may already have their own contexts on the PGW since a WiFi UE is generally a UE with a service provider subscription. Hence, a data structure that links the existing mobile context of a UE to its WiFi context under the LTE-CPE context is sufficient. The policy rules for direct LTE access and WiFi access for the same UE can be different.

For MRME 20, admission control dictates limiting the number of WiFi users. This is based on the number of existing users and their aggregate bandwidth and QoS requirements. For closed subscriber groups, MRME 20 maintains a database of users with permitted LAN access at a particular physical location of the LTE-CPE. Only permitted users can be offered connectivity. For the of EPC QoS to the LAN, MRME 20 is configured to provide the WCO that maps parameters (e.g., EPC QoS, AMBR, GBR, QCI, ARP) to corresponding LAN parameters for rate-limiting, differentiated QoS, etc.

In addition, for LTE-CPE 24, this device can perform EPC authentication for the LAN user. For example, LTE-CPE 24 can be configured for initiating EPS bearer modification upon LAN attach (e.g., WiFi association); initiating EPS bearer deactivation upon LAN detach (e.g., WiFi dissociation); and declining EPC access based on the admission control performed by the MRME. LTE-CPE 24 can also be responsible for declining EPC access based on a closed subscriber group verification provided by MRME 20. In addition, LTE-CPE 24 can be responsible for maintaining LAN user context (including authentication, QoS, and policy); mapping of LAN user context to the corresponding LTE EPS bearer context; and rate-limiting traffic on the LAN interface based on the signaling from MRME 20 (co-located WLC). Also, LTE-CPE 24 can be configured for setting the user priority levels for WLAN access based on the WCO provided by MRME 20.

Figure 4:
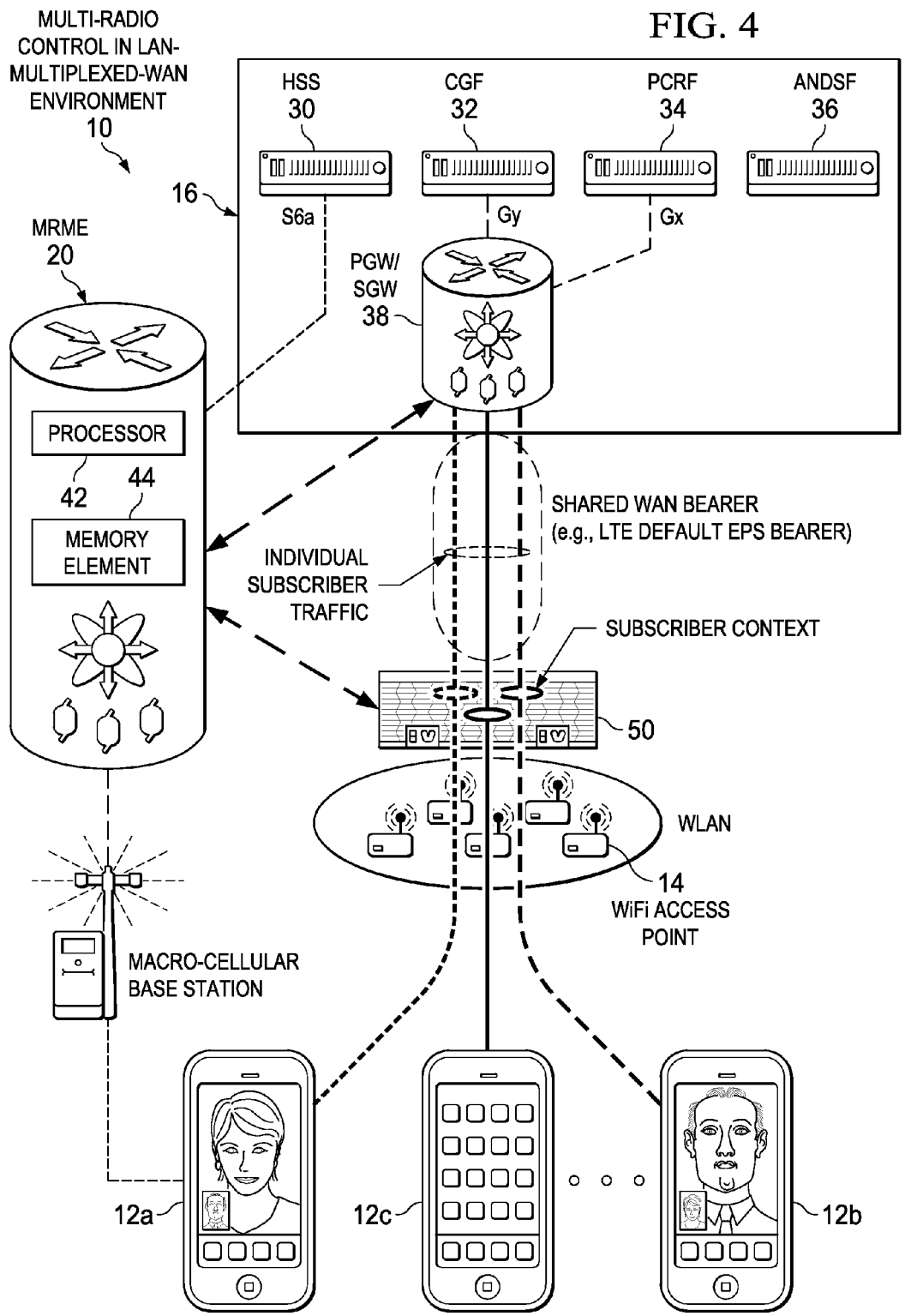
FIG. 4 is a simplified block diagram illustrating multi-radio control in a multiplexed environment in accordance with another embodiment of the present disclosure.

Turning to FIG. 4, FIG. 4 is a simplified block diagram illustrating multi-radio control being performed in a LAN-multiplexed-WAN environment in accordance with one embodiment of communication system 10. Note that much of the infrastructure of FIG. 4 overlaps with that provided in FIG. 1. Additionally, it should be noted that a WiFi mobile multiplexer (WiMM) 50 is provided in this architecture. In this particular example, a subscriber context is being provided in WiMM 50. In addition, a shared WAN bearer (e.g., LTE default EPS bearer) exists between PGW/SGW 38 and WiMM 50, where individual subscriber traffic propagates between these elements.

Figure 5:
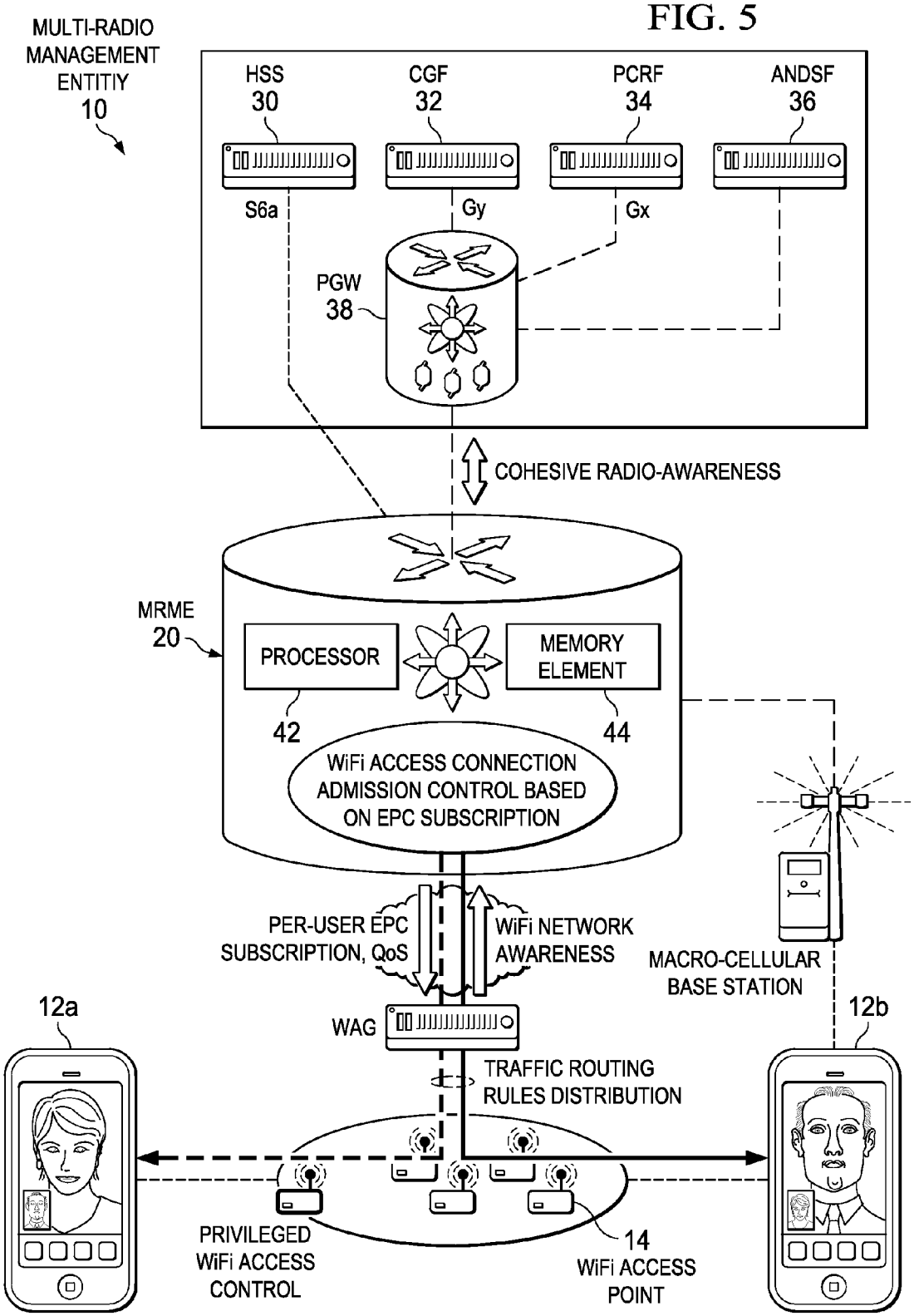
FIG. 5 is a simplified block diagram illustrating example details associated with a multi-radio management entity of the communication system.

FIG. 5 is a simplified block diagram illustrating an instance of MRME 20 in accordance with an example embodiment of communication system 10. Note the per-user EPC subscription and QoS that exist between the WAG and MRME 20. Note also that the WiFi network awareness between these elements, as is being illustrated. Within MRME 20, there is WiFi access connection admission control, which can be based on the EPC subscription. Between each endpoint (i.e., UEs 12a, 12b) and the WAG is traffic routing rules distribution. In addition, in this particular example, PGW 38 facilitates a cohesive radio awareness with MRME 20.

In operation of certain embodiments, components of the present disclosure effectively manage multi-radio connectivity service in which the subscribers attach to the mobile network via a LAN technology (such as WiFi) to a device that provides a shared common mobile network bearer (such as an EPS bearer in 4G LTE, PDP context in 3G UMTS, etc.). This can offer gains achievable from the statistical multiplexing of LAN subscriber traffic over the mobile network bearer, while simultaneously ensuring individual subscriber management of WiFi users at the mobile network gateway. As a point of clarification, such a statistical multiplexing of WiFi subscribers to a shared mobile network bearer (EPS Bearer or PDP context) is in contrast to WiFi subscribers attaching to the mobile network without sharing a common EPS bearer or a PDP context. As a matter of additional clarification, such a protocol is in contrast to WiFi subscribers sharing a common mobile network bearer, but without being individually managed by the mobile network gateway.

WiMM 50 can intelligently multiplex WiFi subscriber traffic onto a shared mobile network bearer based on the communication with MRME 20. In one embodiment, WiMM 50 can be implemented on an LTE/3G UE device that simultaneously acts as a router towards the WiFi access and as a user equipment towards the LTE/3G network. WiMM 50 signals the WiFi subscriber parameters to MRME 20. These new parameters can include WiFi-Subscriber-IMSI, IPv6 Prefix, IPv4 address, SSID, geographical location. In one embodiment, these parameters are signaled using the 3GPP standard NAS and the GTP messages.

Note that the mobile network gateway can decide which IP address to assign to the WiFi subscriber based on the policy configured either locally or obtained via an external server. Such a determination can be based on the explicit knowledge (signaled by the WiMM and subsequently by the MRME) that the subscriber attachment is for a WiFi subscriber that is connecting via a shared mobile network bearer. Such a determination can also be based on the operator policy as to whether the WiFi subscriber is offered only nomadic service without a persistence of service continuity across multiple radio networks, or if the WiFi subscriber is offered full mobility service with the persistence of service continuity across multiple radio networks.

MRME 20 can be configured to provide the WiFi access point usage and the prevailing network information to the mobile network gateway, which in turn can provide traffic routing rules to MRME 20. Subsequently, MRME 20 can be configured to provide the traffic routing rules to the UE. The traffic routing rules determine the mapping of a particular traffic set to the corresponding radio technology. Such rules can be dynamic and dependent on such factors as the time of day, subscriber profile, etc. MRME 20 is configured to receive WiFi access point information upon each subscriber attaching or detaching (and/or at other configurable times). With the provided network health information, the mobile network gateway is configured to assign a particular traffic set to the appropriate radio technology. Such traffic routing information can be provided to the UE via MRME 20.

In certain cases, MRME 20 can be configured to provide the network health information to the mobile network gateway as a set of new parameters in the GTP. Subsequently, the mobile network gateway provides the traffic routing rules for all the concerned radio technologies (3G, 4G, WiFi) as a set of new parameters in the GTP to the MRME. In certain instances, MRME 20 can be configured to provide the traffic routing rules to the UE for the relevant radio technologies (3G, 4G, WiFi) as a set of new parameters in the 3GPP NAS protocol. MRME 20 can be configured to provide the traffic routing rules as a set of new parameters in the NAS protocol to the WiMM, which in turn provides those rules to the UE as a set of new DHCP or IPv6 Neighbor Discovery options.

Figure 6:
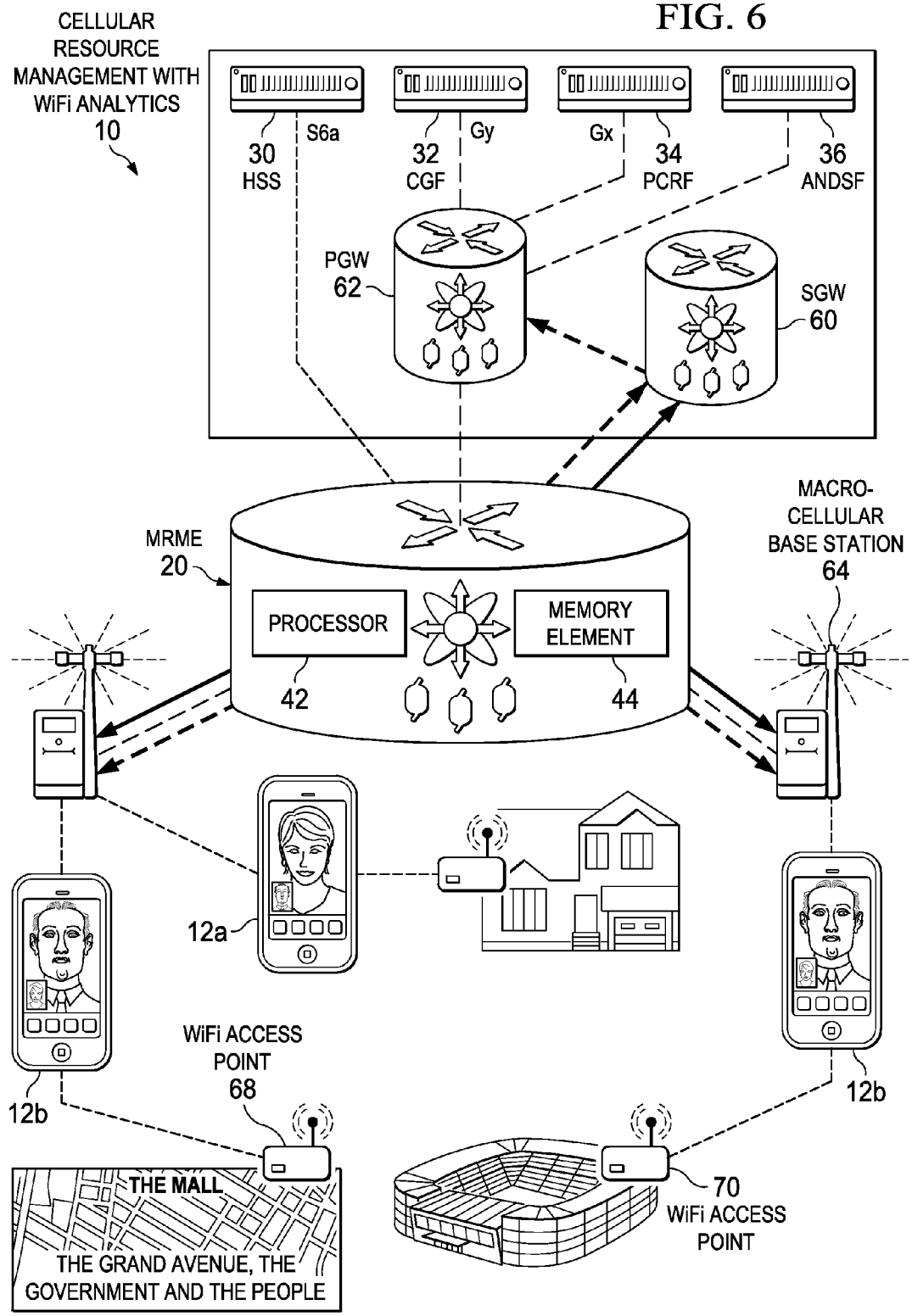
FIG. 6 is a simplified block diagram illustrating example details associated with a cellular resource management architecture that employs WiFi analytics in the communication system.

FIG. 6 is a simplified block diagram illustrating example details associated with cellular resource management with WiFi analytics. This particular example includes PGW 62 and SGW 60 as separate elements, although they may be co-located in other embodiments. In addition, a WiFi access point 70 is coupled to an evolved node B (eNB) 64, which may be reflective of a macrocellular base station. WiFi access point 70 is associated with a stadium in this particular example. In addition, a different access point 68 may be provisioned at a mall location. The radio resources can be provided by eNB 64, which can also provide radio resource management. Tunnel resource management can be provided by SGW 60, where packet data network (PDN) connection management is provided by PGW 62.

Multi-radio small cells offer a significant tool to enhance network coverage and capacity for mobile service providers. In certain environments, the mobile service provider can leverage the costs associated with deploying a small cell for cellular network to also include the WiFi as an access network. This enables the provider to use WiFi to support the burgeoning demand on capacity and to relieve congestion on cellular networks. However, the user experience can vary greatly on WiFi without adequate admission control and resource management. Embodiments of the present disclosure can use multi-radio information to make intelligent admission decisions such that a service provider can manage their overall network more intelligently and effectively.

When a mobile device has multi-radio capability, it can attach to more than one radio network simultaneously, for instance to LTE radio and WiFi. When a mobile service provider (MSP) controls cellular and WiFi access, as in a multi-radio metrocell in which the UE may be attached to the macrocell and WiFi or small cell and WiFi, it is important for the MSP to control the user experience while balancing the desire to offload traffic from cellular to WiFi. More specifically, the users at cell edges that generally receive poor macrocell experience should be given assured WiFi connectivity and experience compared to those having better cellular coverage (e.g., via a small cell). In addition, devices that are known to be high consumers of data (e.g., tablets) should be placed on WiFi if possible, based on the policy (such as the access point name (APN) configuration preference for the radio interface). In addition, the heavy data users also need to be placed on WiFi as much as possible. Also, certain WiFi locations may have restricted access. Only those users with privileged access should be given WiFi connectivity.

In summary, an MSP needs to make intelligent call admission control (CAC) and resource management decision in controlling the Quality of Experience (QoE) over WiFi, which is important, as WiFi becomes an integral part of mobile service delivery. Without such intelligence being provisioned in the network, subscriber experiences can vary widely and, further, be unpredictable during times of over-crowding and congestion. Once a CAC decision is made, it is important to enforce the subscription parameters so that no single user is able to monopolize the WiFi resources and adversely affect other users. This is the role of resource management.

MRME 20 maintains knowledge of multiple radios (macrocellular, small cell, and WiFi), as well as the user attachments to those radios. MRME 20 can be configured with a database of outdoor WiFi access point identifiers (such as unique MAC addresses, or any other such identifier), global positioning system (GPS) locations, and the service set identifiers of interest. MRME 20 can also be configured with a database consisting of a set of WiFi access points that fall within a poor macrocellular coverage zone, which reflects an area of known poor connectivity experience (such as poor signal-to-noise ratio and geometry factor). MRME 20 may also include a database consisting of a Mobile Equipment Identity (MEI) mapped to the device type. For instance, knowing the MEI (IMEI or IMEISV), the database could retrieve whether the device is a smartphone or a tablet. Furthermore, MRME 20 may also include a database of heavy traffic users, obtained from an external analytics engine, which outputs data using a call detail record (CDR) on a mobile gateway. In addition, MRME 20 has the user's EPC subscription information such as their Gold/Silver/Bronze tiers, along with the allocated bit rates, etc.

In operation, when an attach request arrives, MRME 20 knows the geographical location of the user within the granularity of the coverage radius of the WiFi access point to which the user is attaching. When a UE successfully attaches to a WiFi access point after authentication, its attach time is recorded by MRME 20. When a UE detaches from an access point, the detach time is recorded by MRME 20. With this information, each geographic location served by WiFi access points is attributed with a corresponding user "sojourn time", which indicates a representative time (such as average, median, minimum etc.) across all users of camping on the WiFi access. For instance, a typical user at a game in a stadium is likely to be at the location for approximately two hours. The sojourn times are collected and corrected for hysteresis, and the statistics can be maintained over time. Other relevant access usage statistics can also be maintained.

Each geographic location also has a set of services defined based on its geo-context, which is associated with the preferred services for the location, as specified by the operator policy. For instance, a stadium may have interactive multimedia (based on content caching) as a preferred service, whereas a residential location is configured with voice over WiFi as a preferred service. Such services can be provisioned using a construct such as APN. In regards to signaling, when a UE connects to the EPC via WiFi, MRME 20 consults its database to verify the geo-origin of the request, and performs the following actions.

If the sojourn time for the location is at least as much as an operator-configured threshold for the location, MRME 20 sends a message "X-Request" to SGW 60 requesting it to release all user plane bearer resources for the UE. SGW 60 responds with an "X-Response" to MRME 20, which then sends an "X'-Request" to the macrocellular base station (eNB), requesting it to release the radio resources associated with the UE. The eNB releases the Resource Reservation Control (RRC) connection and the associated UE context and responds with an "X'-Response" to MRME 20. This causes the expeditious release of precious macro radio resources. This also causes the release of user plane tunnel resources at SGW 60.

If the sojourn time for a location is at least as much as a configured threshold for the location and the geo-context so indicates, MRME 20, in addition to releasing the macro radio resources alone, also releases the EPS bearer(s) for applicable PDNs in the EPC gateways. MRME sends a 'Y-Request' message (via SGW) to the PGW, which responds, with a 'Y-Response' message. Subsequently, MRME 20 sends a "Y'-Request" message to the eNB and the UE, and receives a "Y'-Response" message in return.

For example, when the geo-location is residential, an operator policy can be configured so that MRME 20 releases any dedicated EPS bearers as well as any PDN connection associated with an IMS APN (on cellular) if it can be served on the WiFi. With this configuration, some PDNs over cellular are deactivated entirely (i.e., both radio and core network resources are released), and the radio resources are released for those PDNs which are still resident on cellular network (while their EPC session state is maintained). Additionally, the above procedures are performed as a function of ToD triggers. Operators may establish different thresholds for sojourn times and geo-context based on the ToD policy of interest.

In a particular implementation, MRME 20 can be provisioned in a control node such as an MME in the LTE/SAE architecture. MRME 20 can have a well-defined interface to the WiFi controller, which manages the WiFi access points, as well as the user attachment. The WiFi controller may physically reside inside the same node as MRME or it may reside elsewhere in the network with a secure connection to MRME 20. Similarly, MRME 20 communicates using a well-defined interface with the normal MME entity.

The message sequence X-Request/X-Response and X'-Request/X'-Response can be implemented using the S1 Release Procedure [e.g., TS 23.401]. The sequence X-Request/X-Response can map to the Release Access Bearer Request/Release Access Bearer Response sequence [e.g., TS 29.274]. The sequence XT-Request/XT-Response maps to S1-AP UE Context Release Command/S1-AP UE Context Release Complete sequence [e.g., TS 36.413].

The message sequence Y-Request/Y-Response can be implemented either as an MME-initiated Bearer Deactivation procedure or MME-initiated PDN Disconnection procedure [TS 23.401]. The messages can map to Delete Bearer Request/Delete Bearer Response and Delete Session Request/Delete Session Response respectively [TS 29.274]. The message sequence Y'-Request/Y'-Response can be implemented using E-RAB Release Command (S1-AP) with Deactivate EPS Bearer Context Request (i.e., NAS) and E-RAB Release Response (S1-AP) & Deactivate EPS Bearer Context Accept sequences [TS 24.301, TS 36.413].

Figure 7:
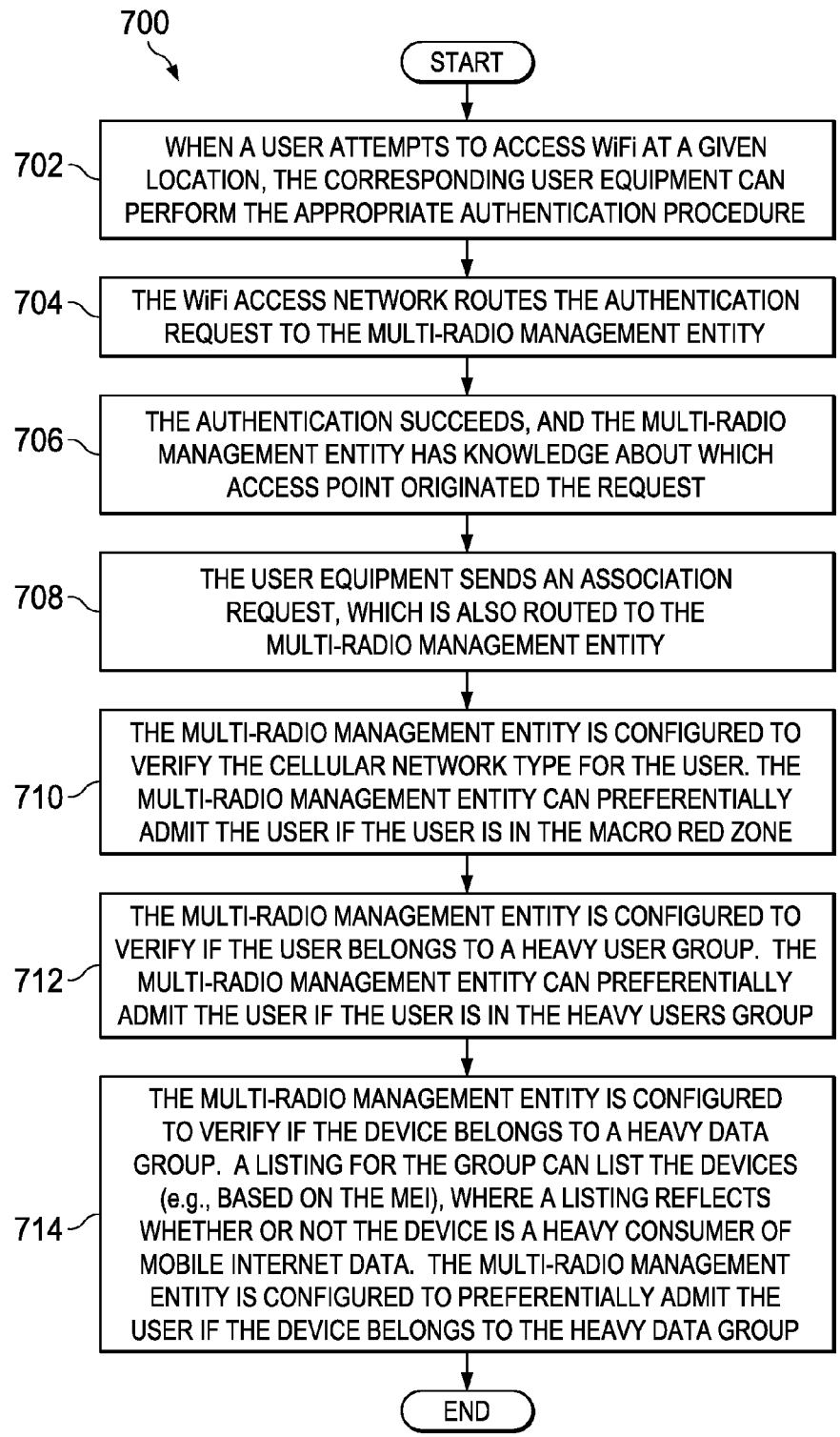
FIG. 7 is a simplified flowchart illustrating example activities associated with a WiFi analytics component associated with the communication system.

FIG. 7 is a simplified flow diagram 700 illustrating example activities associated with intelligent provisioning of end users in a network environment. This particular flow may begin at 702, when a user attempts to access WiFi at a given location. The corresponding UE can perform the appropriate authentication procedure. As a part of this procedure, the UE provides necessary credentials (e.g., its IMSI). Additionally, the UE can also supply the corresponding MEI. At 704, the WiFi access network routes the authentication request to the MRME. Once the authentication succeeds at 706, the MRME has the knowledge of which access point the request is arriving from, as well as the subscriber details. At 708, the UE sends an association request, which is also routed to the MRME. At this point, the MRME performs the following series of actions. The exact sequence of actions is configurable based on policy.

At 710, the MRME is configured to verify the cellular network type for the user. The MRME can preferentially admit the user if the user is in the Macro Red Zone. The MRME can also redirect an existing candidate user to a different AP if the resource situation so demands. At 712, the MRME is configured to verify if the user belongs to a Heavy User Group. This group contains identities (e.g., IMSI/NAI) of known heavy users of the mobile Internet. The MRME can preferentially admit the user if the user is in the Heavy User Group. In addition, the MRME can redirect an existing candidate user to a different AP if the resource situation so demands. In 714, the MRME is configured to verify if the device belongs to a Heavy Data Group. A listing for the group can list the devices (e.g., based on the MEI), where a listing reflects whether or not the device is a heavy consumer of mobile Internet data. The MRME is configured to preferentially admit the user if the device belongs to the Heavy Data Group. The MRME can also redirect an existing candidate user to a different AP if the resource situation so demands.

In terms of infrastructure configured to perform certain activities discussed herein, MRME 20, LTE-CPE 24, WiMM 50, and PGW/SGW 38 are network elements that can facilitate many of the processing, resource management, and/or access activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, user equipment, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, MRME 20, LTE-CPE 24, and/or WiMM 50 include software to achieve (or to foster) the resource management activities discussed herein. This could include the implementation of instances of various software modules to perform these activities. Additionally, each of these elements can have an internal structure (e.g., a processor, a memory element, etc.) to facilitate some of the operations described herein. In other embodiments, these access activities may be executed externally to these elements, or included in some other network element to achieve the intended functionality. Alternatively, MRME 20, LTE-CPE 24, and/or WiMM 50 may include software (or reciprocating software) that can coordinate with other network elements in order to achieve the resource management activities described herein. In still other embodiments, one or several devices may include any suitable algorithms, hardware, software, components, modules, interfaces, or objects that facilitate the operations thereof.

In certain example implementations, the resource management functions outlined herein may be implemented by logic encoded in one or more non-transitory tangible media (e.g., embedded logic provided in an application specific integrated circuit [ASIC], digital signal processor [DSP] instructions, software [potentially inclusive of object code and source code] to be executed by a processor [processor 42 shown in FIG. 1], or other similar machine, etc.). In some of these instances, a memory element [memory element 44 shown in FIG. 1] can store data used for the operations described herein. This includes the memory element being able to store instructions (e.g., software, logic, code, etc.) that are executed to carry out the activities described in this Specification. The processor (e.g., processor 42) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the access activities as outlined herein. Additionally, each of these devices may include a processor that can execute software or an algorithm to perform the access management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a connection request;
   providing admission control of access via a WiFi network and a mobile network by rejecting the connection request if a threshold for a number of WiFi connections has been reached;
   marking a Differentiated Services Code Point (DSCP) in an Internet protocol (IP) header to enable a WiFi access point to provide WiFi QoS consistent with mobile network subscription parameters, based on service data flow rules; and
   signaling a wireless connectivity object (WCO) to the WiFi network if the threshold has not been reached, the WCO including a mapping of a parameter of the mobile network to a parameter of the WiFi network.

2. The method of claim 1, further comprising:
   transmitting a mobile subscriber identity to multiplex a local area network (LAN) session to a mobile network session.

3. The method of claim 1, further comprising:
   transmitting a bearer resource message to distribute traffic across the WiFi network and the mobile network, which is a cellular access, using dynamic host configuration protocol (DHCP) options.

4. The method of claim 1, further comprising:
   sending a tunneling protocol message to establish a connection with a packet gateway (PGW)/serving gateway (SGW), which is coupled to a small cell.

5. The method of claim 1, further comprising:
   rejecting the connection request based on at least one of an aggregate maximum bit rate (AMBR) parameter, an allocation and retention priority (ARP) parameter, and a quality of service (QoS) class identifier.

6. The method of claim 5, wherein the WCO includes at least one of the aggregate maximum bit rate (AMBR) parameter, the allocation and retention priority (ARP) parameter, and the quality of service (QoS) class identifier.

7. The method of claim 1, further comprising:
   preempting an existing connection at a WiFi access point if a mobile subscriber identity is received.

8. The method of claim 7, wherein the existing connection is redirected to a different WiFi access point.

9. The method of claim 1, further comprising:
   providing a privileged access control at a WiFi access point, in which a subscriber identity is verified before a device is allowed access at the WiFi access point.

10. The method of claim 1, wherein the parameter of the mobile network is a mobile network quality of service (QoS) parameter, and the parameter of the WiFi network is a WiFi QoS parameter.

11. The method of claim 1, further comprising:

enforcing rate-limiting of subscriber traffic in the WiFi network based on an equivalent to an aggregate maximum bit rate (AMBR) parameter.

12. The method of claim 1, further comprising:

signaling to the WiFi network to establish a tunnel from a WiFi access network gateway to a mobile network gateway.

13. The method of claim 1, further comprising:

establishing a tunnel to receive connectivity parameters as DHCP or IPv6 Neighbor Discovery options.

14. The method of claim 1, further comprising:

signaling tunnel endpoint parameters of a WiFi access network gateway to a WiFi access point to establish a tunnel with the WiFi access network gateway.

15. The method of claim 1, further comprising:

establishing a first connection to a long-term evolution-customer premise equipment (LTE-CPE), which is coupled to a WiFi access point; and establishing a second connection to provide an LTE service over a backhaul.

16. A non-transitory medium having logic embedded thereon that includes code for execution and, when executed by a processor, operable to perform operations comprising:

receiving a connection request;

providing admission control of access via a WiFi network and a mobile network by rejecting the connection request if a threshold for a number of WiFi connections has been reached; and signaling a wireless connectivity object (WCO) to the WiFi network if the threshold has not been reached, the WCO including a mapping of a parameter of the mobile network to a parameter of the WiFi network, wherein a Differentiated Services Code Point (DSCP) is marked in an Internet protocol (IP) header to enable a WiFi access point to provide WiFi QoS consistent with mobile network subscription parameters, based on service data flow rules.

17. The logic of claim 16, the operations further comprising:

transmitting a mobile subscriber identity to multiplex a local area network (LAN) session to a mobile network session.

18. The logic of claim 16, the operations further comprising:

rejecting the connection request based on at least one of an aggregate maximum bit rate (AMBR) parameter, an allocation and retention priority (ARP) parameter, and a quality of service (QoS) class identifier, wherein the WCO includes at least one of the aggregate maximum bit rate (AMBR) parameter, the allocation and retention priority (ARP) parameter, and the quality of service (QoS) class identifier.

19. A network element, comprising:

a memory element; and a processor operable to execute instructions such that the network element is configured to receive a connection request, wherein the processor is configured to provide admission control of access via a WiFi network and a mobile network by rejecting the connection request if a threshold for a number of WiFi connections has been reached, and to signal a wireless connectivity object (WCO) to the WiFi network if the threshold has not been reached, the WCO including a mapping of a parameter of the mobile network to a parameter of the WiFi network, wherein a Differentiated Services Code Point (DSCP) is marked in an Internet protocol (IP) header to enable a WiFi access point to provide WiFi QoS consistent with mobile network subscription parameters, based on service data flow rules.

20. The method of claim 1, further comprising:

providing a multi-radio connectivity service to a mobile subscriber;

managing the multi-radio connectivity service for the mobile subscriber;

providing subscriber access at a first WiFi access point of the WiFi network to provide a redirect service to a second WiFi access point of the WiFi network; and distributing traffic across the WiFi network and the mobile network based on a policy.

* * * * *